INVENTOR
SAUL LEIBINSOHN
BY
OSTROLENK, FABER, GERB & SOFFEN
ATTORNEYS

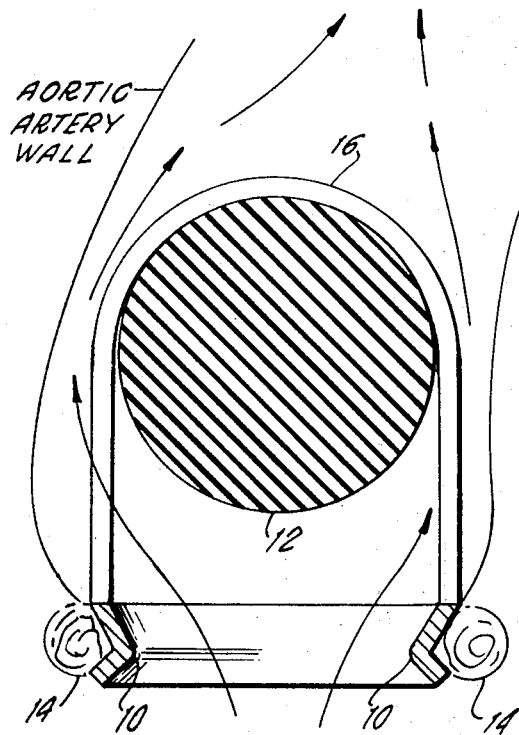
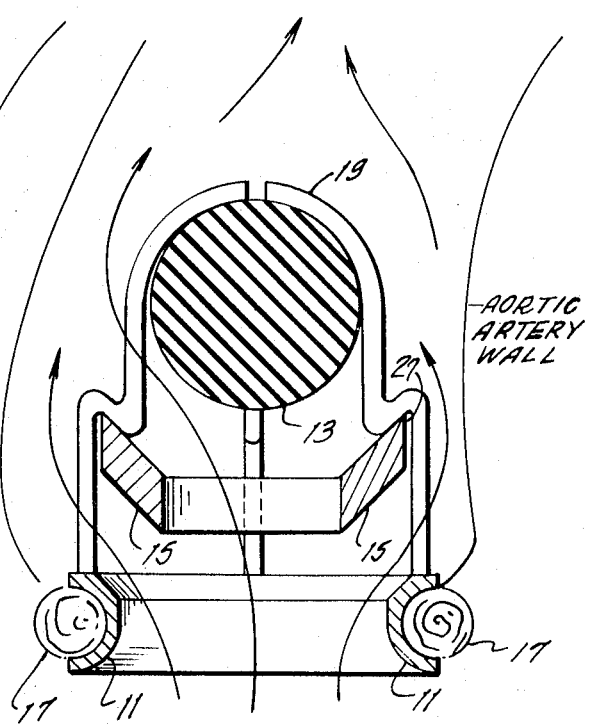
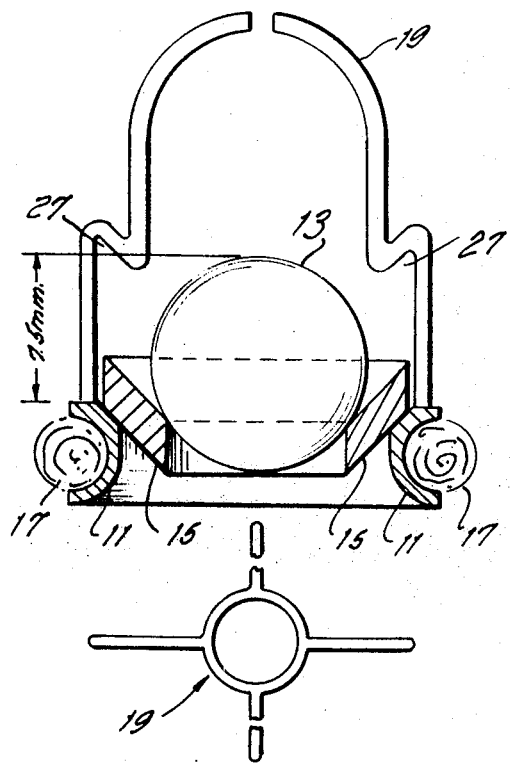
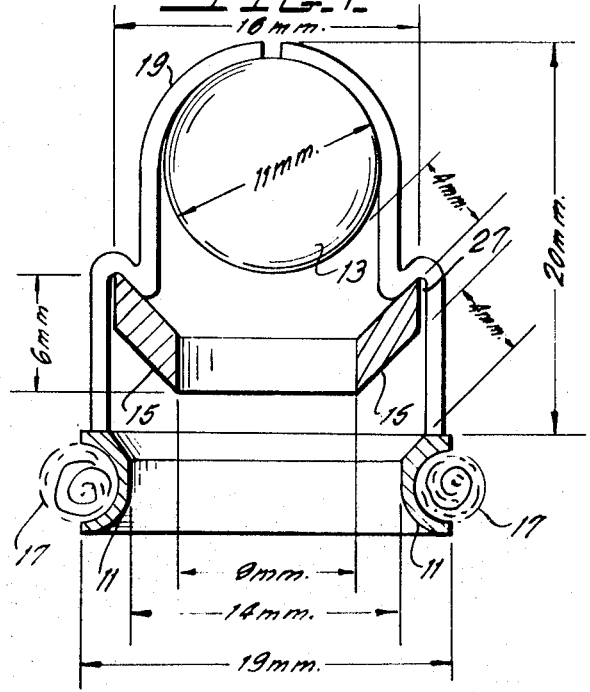

United States Patent Office 3,626,518
Patented Dec. 14, 1971

3,626,518
ARTIFICIAL CARDIAC VALVE
Saul Leibinsohn, 11 Hagardom St., Rishon Lezion, Israel
Filed July 30, 1969, Ser. No. 845,981
Int. Cl. A61f 1/22
U.S. Cl. 3—1
10 Claims

ABSTRACT OF THE DISCLOSURE

Characteristics of the ball valve and disc valve are employed to provide a cardiac valve of improved hydrodynamic design to assure more streamline blood flow and decreased turbulence. At the same time, the valve effects a reduction in volume as compared to ball valves heretofore used, but without lessening the amount of blood flowing therethrough. An intermediate movable seating ring is located between the ball and stationary valve seat so as to provide two flow paths when the valve is in the open position.

---

This invention relates to artificial cardiac valves and, more particularly, to valves of reliable, durable and efficient design while being biologically compatible in heart surgery. Although the present invention will be primarily directed towards an aortic valve, it will be readily apparent that its teachings are equally applicable to bicuspid and tricuspid valves as well.

Since 1960, most successful long-term results in cardiac surgery have been obtained with the use of a ball valve. Approximately two-thirds of all valves being sold today are of this type structure. The second most successful cardiac valve is the disc or leaflet valve, in which the diameter of the disc is substantially equal to the diameter of the ball of the ball valve construction. The advantages of the ball valve are that it provides a better hydrodynamic blood flow and more linear streamlines than the disc valve. The disc valve, on the other hand, takes up much less space in the blood stream and is used in those circumstances where space is at a premium.

The disadvantage of the ball valve—namely its greater volume—is further compounded in aortic surgery because of its relatively long rather than squat construction. In this type of surgery, the ball valve is customarily placed on the base of the aortic artery. The heart surgeon then has two choices: (a) either to use a valve having a large ball to provide a large orifice for blood flow or (b) to use a valve having a small ball diameter and corresponding small orifice, thereby limiting the flow of the blood. This choice is necessitated because a large diameter ball valve may very well operate to block off the artery at a point above the artery, where its opposite walls come closer together. Thus, trade-offs must oftentimes be made between ball valves of different sizes and, also, between a ball valve and a low seating disc valve where necessary, with its limited hydrodynamic characteristic.

As will become clear hereinafter, an artificial cardiac valve embodying the invention and particularly useful in aortic surgery employs two moving parts, rather than the single moving ball of prior design or the disc or the leaflet variety. These two parts comprises a ball and a ring so arranged that when the valve is open, blood may pass between the ring and the artery walls and between the ring and the central ball. Although on first impression, such a two-moving part valve may appear to be of greater volume than the ball valve or disc valve, and also, seated higher in the artery, such is not the case since the ball employed in the valve of the invention may be of much smaller volume. The orifice of the valve has the same cross-sectional area as with a ball valve or disc valve, but because of the ring and smaller ball arrangement, it is of less volume and less overall height.

These and other advantages of the invention will be more fully understood from a consideration of the following drawings in which:

FIGS. 1 and 2 respectively show top and bottom views of a ball valve of the prior art;

FIGS. 7 and 8 show the valve of the present invention in its corresponding opened and closed position, respectively; and FIGS. 9 and 10 respectively show the ball valve and the valve of the instant invention as employed within the aortic artery.

Referring now to FIGS. 1-2, 5-6 and 9, it will be seen that the ball valve of the prior art employs a convex seat 10 for supporting the ball 12 when the valve is closed. The diameter of the ball 12 in a typical construction is of the order of 16.5 millimeters, while the internal diameter of the seat 10 is of the order of 14.5 millimeters. A sewing ring 14 encompasses the seat 10 to provide flexibility to the valve and to insure coaption when the valve is sutured into position. The diameter of the padded ring 14 in this typical construction may be of the order of 19.5 millimeters. In addition, a cage 16 of stainless steel, tantalum or other inert material is provided to hold the ball 12 in proper position. The ball 12 may be comprised of a silicone rubber material and is restricted in its movement by the 19.5 millimeter diameter cage 16. The cage 16 typically is a one piece cast construction of stellite.

Figure 5:
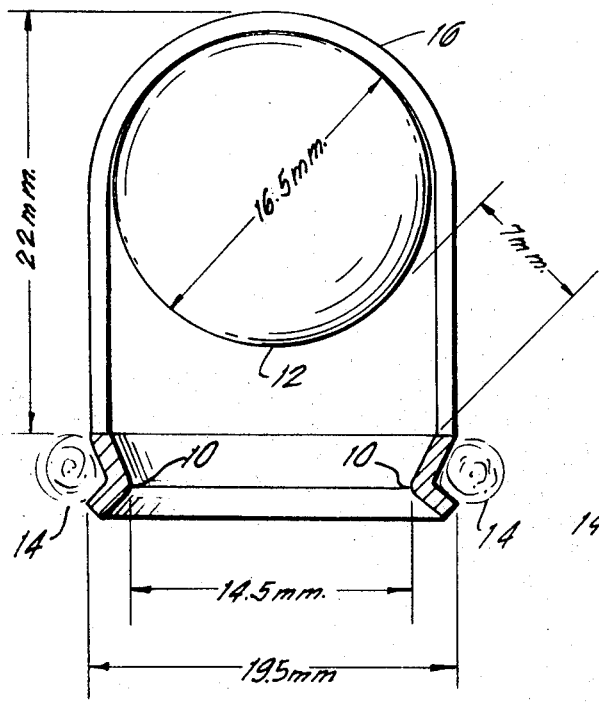
FIGS. 5 and 6 show sectional views of the ball valve in its opened and closed positions, respectively.
Figure 6:
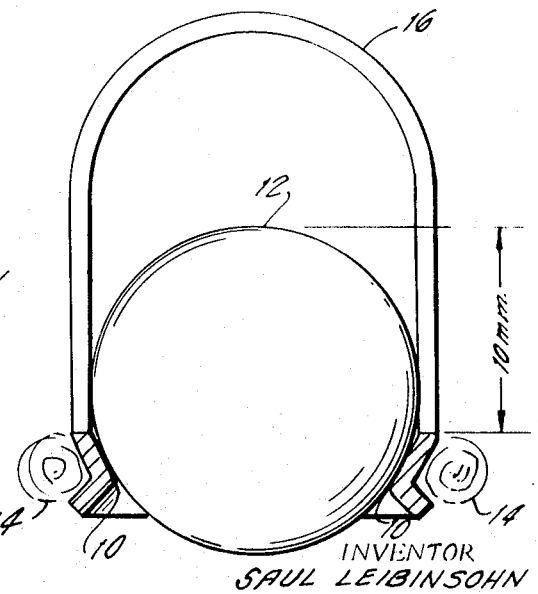

As shown in FIGS. 5, 6 and 9 the cage 16 extends some 22 millimeters above or downstream of the top most portion of the seat 10, and extends into the artery from its implantation base by that amount. As can be seen from these figures, blood will flow through the orifice of the seat 10, and around the ball 12 through the aortic artery. The orifice area for the configuration described is of the order of 2.6 centimeters square while that of the ball is approximately 2.0 square centimeters. As was previously mentioned, the flow is streamline and with little turbulence. Two-thirds of the artificial cardiac valves presently in use are of this type construction.

Referring now to FIGS. 3-4, 7-8 and 10, there is shown an artificial cardiac valve constructed in accordance with the invention. Such a valve differs from the ball type in that an intermediate ring 15 is inserted between the seat 11 of the valve and the ball 13. The overall construction of this valve is also shown, with the diameter of the seat 11 being some 14 millimeters, and that of the padded sewing ring 17 being of the order of 19 millimeters. Thus, the orifice area of the valve of FIGS. 3-4, 7-8 and 10 is substantially the same as with the ball valve so that the amount of blood flowing in both types of valves will essentially be the same.

However, whereas only the ball 12 of the prior arrangement was moved to permit blood flow, in the valve of the present invention, both the ball 13 and the intermediate ring 15 are caused to move. Bends 27 on the cage 19 of the valve of FIGS. 3-4, 7-8 and 10 limit the upwards movement of the ring 15 to some 7.5 millimeters, while the silicone rubber or Teflon ball 13 may proceed to the top-most limit of the cage 19. In the closed position, the ring 15 rests against the seat 11, and the ball 13 rests within the ring 15 (FIG. 8). In the embodiment of the invention illustrated, a ball of approximately 11 millimeters diameter was employed with a ring 15 of 9 millimeters orifice opening and 16 millimeters outer diameter.

A number of advantages follow from the use of a cardiac valve of the type described in FIGS. 3-4, 7-8 and 10 as compared to the ball valve of FIGS. 1-2, 5-6 and 9. As can be best seen from FIG. 9, the flow of blood with the ball valve arrangement is through the orifice opening into the aortic artery, and between the artery walls along the surface of the ball 12. The ball surface area in contact with the blood for the typical configuration employed is of the order of 8.4 square centimeters, with the ball volume being approximately 2.1 cubic centimeters. With the FIG. 10 arrangement showing the valve of the instant invention, on the other hand, blood flow is in two paths; first, between the seat 11 and the ring 15 along the aortic artery wall and second, between the ring 15 and the ball 13. The ring and ball surface area in contact with the blood flow in FIG. 10 is approximately 7.3 square centimeters, with the volume of the ring 15 and ball 13 being somewhat less than 1 cubic centimeter, more particularly 0.95 cubic centimeter.

Because two paths exist with the invention for the flow of blood within the aortic artery, and because the resulting surface area in contact with the blood is less with the FIG. 10 arrangement than with the FIG. 9 configuration, the artificial cardiac valve of the invention provides more streamline flow and reduced turbulence as compared to the basic ball valve. As a result, much less energy is required in pumping the blood through the aortic artery than has heretofore been the case.

A second advantage with the valve of the invention relates to the amount of energy needed to dislodge the ball 13 from its stationary or closed orifice position. With the ball valve having a ball 12 of substantially 2.0 square centimeters cross-sectional area, a given amount of energy must be expended to raise the ball from the closed orifice position. With the arrangement of the present invention, on the other hand, the cross-sectional area of the ball 13 is of the order of 0.95 square centimeter and, therefore, easier to dislodge. Once the ball 13 is dislodged, only a relatively small amount of energy is required to move the surrounding intermediate ring 15, of approximately 1.37 square centimeters cross-section. Thus, with the cardiac valve of the invention, less energy is required to change the valve from a closed to an open position, and the pumping force is correspondingly reduced.

Noting further from FIG. 10 that the top most portion of the cage 19 extends less into the aortic artery than does the corresponding cage 16 of the conventional ball valve—and also the reduced cage dimension to hold the lower diameter ball 13 in open position—it will additionally be seen that the tendency for the valve of the invention to block the aortic artery is lessened. This feature also leads to a lessening in the amount of pressure needed to cause blood to flow in the artery, as well as to improve the linear flow through the now enlarged openings between the cage and the artery walls.

Figure 1:
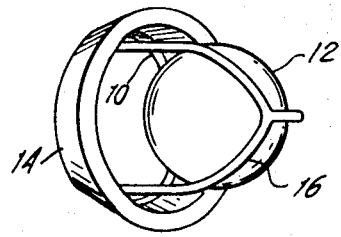
Figure 2:
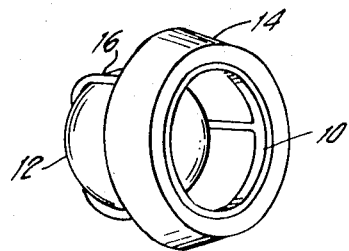
Figure 3:
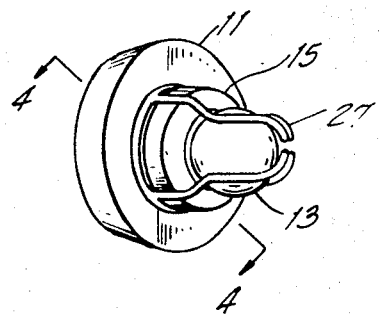
FIG. 3 is a perspective view of an artificial cardiac valve embodying the invention.
Figure 4:
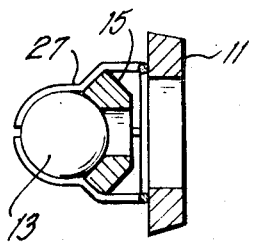
FIG. 4 is a cross-section taken through line 4—4 of FIG. 3 looking in the direction of arrows 4—4.

A further advantage of the invention resides in the design of the cage 19, shown below in FIG. 8, prior to its fabrication into the form more clearly illustrated in FIGS. 3 and 4. In particular, the form of this cage can be established by a stamping process from a stainless steel or other inert material. Such a fabrication step is preferable to the one piece casting of the prior ball valve cage in that any tendency for burrs or other surface defects to develop are substantially lessened. As will be readily apparent, the existence of such defects tend to establish a turbulence in the blood flow stream, which can be overcome only by having a greater pumping force from the heart. The cage construction of the invention, on the other hand, provides a substantially smooth configuration throughout the area of blood flow, to eliminate the need for any unnecessary, undue pumping requirement that would otherwise cause heart strain.

It will thus be seen that the intermediate ring 15 of the valve of the invention is substantially annular in nature and has an outer diameter greater than the inner diameter of the seat 11 and is supported thereby. Its inner diameter, in turn, is less than the diameter of the ball 13 so that in a closed valve position, the larger diameter ball prevents blood flow through the ring 15 from the orifice opening of the valve defined by the inner diameter of seat 11.

It will also be seen that the cage 19 of the valve has a dimension at its upper portion which, when measured parallel to the orifice opening, is comparable to that dimension. At its lower portion, on the other hand, the dimension is greater than the outer portion of the ring 15. Thus, along with the bends 27 along its sides, the cage 19 serves to limit the upwards movement of the ring 15, which would otherwise proceed to the upper portion of cage 19.

I claim:
1. A cardiac valve including first means having a stationary seat surrounding a circular orifice substantially disposed in a plane perpendicular to the flow direction of fluid as it enters said valve, second means connected to the stationary seat and defining a cage extending downstream from said first means, annular seating means having an axial opening therethrough within said cage extending generally parallel to said orifice and movable between a first position in engagement with said stationary seat and a second position spaced from said seat and downstream thereof, said seating means defining a movable seat on the downstream side thereof, a ball within said cage disposed on the downstream side of said seating means and movable between a first position in engagement with said movable seat when said seating means is in its said first position and a second position spaced from said movable seat on the downstream side thereof when said seating means is in its said second position, limiting means on said cage for engaging said seating means in said second position to maintain said ball spaced from said movable seat, said ball and said seating means when in their respective first positions cooperating to close said orifice, said seating means on the upstream side thereof having a tapering surface that flares outward in the direction of fluid flow to reduce turbulence in the fluid stream portion between said stationary seat and said seating means when the latter is in its said second position.

2. A cardiac valve as set forth in claim 1 in which said limiting means is defined by the cage intermediate its ends being provided with inward projections which limit downstream movement of said seating means to its said second position.

3. A cardiac valve as set forth in claim 2 in which the cage in the region thereof downstream of said inward projections is shaped and proportioned to essentially prevent lateral movement of said ball.

4. A cardiac valve as set forth in claim 2 in which the inner ends of said inward projections are arranged in a circle having a diameter no smaller than the diameter of said ball.

5. A cardiac valve as set forth in claim 2 in which the movable seat flares outward in the direction of fluid flow and the inward projections slant inwardly in a direction opposite to fluid flow.

6. A cardiac valve as set forth in claim 3 in which the cage in the region thereof upstream of said inward projections is generally cylindrically shaped and has a diameter slightly greater than that of the outer diameter of said seating means to guide movement of the latter between its said first and second positions.

7. A cardiac valve as set forth in claim 2 in which the stationary and movable seats both flare outward in the direction of fluid flow.

8. A cardiac valve as set forth in claim 7 in which the cage in the region thereof downstream of said inward projections is shaped and proportioned to essentially prevent lateral movement of said ball.

9. A cardiac valve as set forth in claim 2 in which the cage in the region thereof upstream of said inward projections is generally cylindrically shaped and has a diameter slightly greater than that of the outer diameter of said seating means to guide movement of the latter between its said first and second positions.

10. A cardiac valve as set forth in claim 6 in which the stationary and movable seats both flare outward in the direction of fluid flow.

References Cited

UNITED STATES PATENTS

| | | | |
|---|---|---|---|
| 213,186 | 3/1879 | Gassett | 137—512.1 |
| 3,099,016 | 7/1963 | Edwards | 3—1 |
| 3,263,239 | 8/1966 | Edwards et al. | 3—1 |
| 3,367,364 | 2/1968 | Cruz et al. | 3—1 |

RICHARD A. GAUDET, Primary Examiner

R. L. FRINKS, Assistant Examiner

U.S. Cl. X.R.

3—DIG 3; 137—512.1, 512.3, 533.11